UNITED STATES PATENT OFFICE.

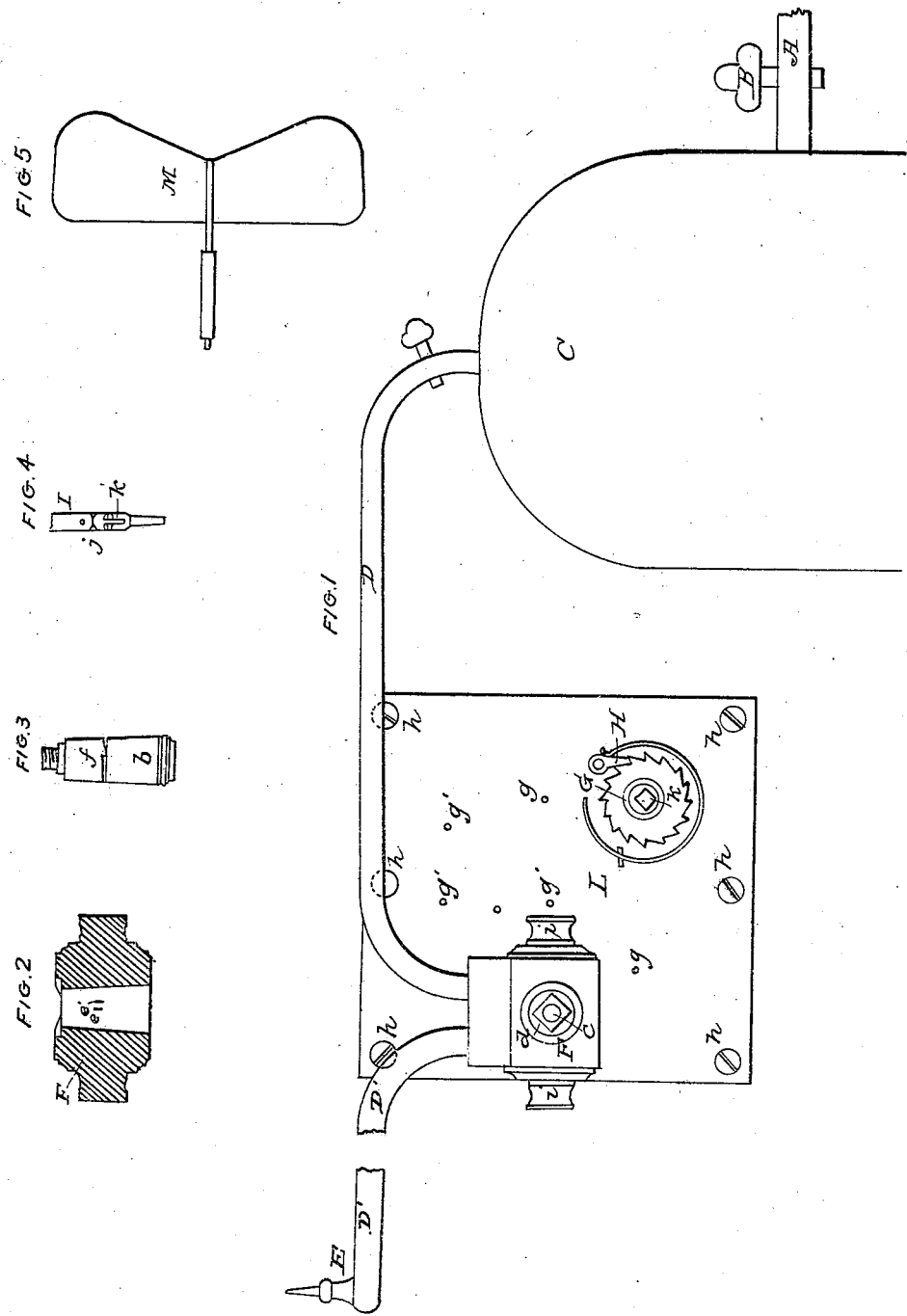

O. L. LAWSON AND A. A. STARR, OF NEW YORK, N. Y.

STOP-COCK GAS-REGULATOR.

Specification of Letters Patent No. 17,936, dated August 4, 1857.

*To all whom it may concern:*

Be it known that we, O. L. LAWSON and A. A. STARR, of the State, county, and city of New York, have invented certain new and useful Improvements in Portable Gas Apparatus; and we do hereby declare that the following is a full, clear, and exact description of the same, reference being had to the accompanying drawings and to the letters of reference marked thereon.

Figure 1 is a side elevation. Fig. 2 is a section of the invention showing the escape of the gas. Fig. 3 is the plug that fits into Fig. 2. Fig. 4 is a view of the double jointed shaft which is attached to the cock. Fig. 5 is a view showing the fly wheel M.

To enable others skilled in the art to make and use our invention we will proceed to describe its construction and operation.

In the construction of our invention we use any of the known materials used for such purposes.

In Fig. 1 A connection pipe for receiving the gas from any common street gas pipe, B stop cock C cylinder, for containing condensed gas, D feed pipe, $a$ stop cock, D' escape pipe, E the burner F graduating gas cock $b$ the end of the revolving plug $c$ the screw, $d$ the washer, $i$ the projecting ends of the cock, $g$ the ends of the journals of the gearing or driving apparatus, $h$ the screw for fastening the whole apparatus together G the ratchet wheel, H the pawl or ratchet.

In Fig. 2 F the cock $e$ $e'$ the apertures to receive and let off the gas, the flow of which is regulated by the conical groove in the plug $b$.

In Fig. 3, $b$, the cone shaped plug fitting in the orifice in cock F, $f$, conical groove extending entirely around the plug $b$.

In Fig. 4, I the shaft, $j$ joint 1, $k'$ joint 2, each bending or working in a direction different to each other, the object of which is to accommodate the shaft to the position of the plug—the pointed end of which shaft enters into the large or base end of the conical plug $b$.

In the operation of our invention we contemplate using the common street gas, or a gas may be made for the purpose in any known way, the cock $a$ is closed and cock, $b$, is opened and by means of a force pump the gas is forced into the cylinder C to any given pressure required as high as 180 lbs to the square inch, or a condensation of 12 times its own bulk, when the cylinder is full I then close cock, $b$, (the machinery having previously been wound up) and the apparatus is ready for use.

The spring which is wound up on shaft $k$ is an ordinary main spring which is held to its tension by the ratchet $g$ and pawl, $h$, the mechanism between plates L is composed of common cog or gear wheels so arranged and constructed with the fly wheel M, that I am enabled to turn the shaft I, once around in any given time required the revolution of the plug being in accordance with the amount of gas I wish to consume in a given time. By opening the stop cock $a$ the gas from cylinder C, is let into feed pipe D connected with graduating cock, F, which cock is composed of cock F, with conical aperture as seen in Fig. 2 and escape apertures $e$, $e$,' through which plug $b$, with conical groove $f$ enters the groove $f$, being in contact with apertures $e$ and $e'$.

When the gas is at its highest pressure in cylinder C, and I wish to commence the consumption of gas, the mechanism revolving the plug, $b$, is so arranged that the apex end of the groove on the plug is in direct contact with the aperture $e$, for admitting the gas to the cock and as the gas enters the cock it passes through the groove, $f$, to the aperture $e$ where it escapes from the cock and enters a scape tube D' and through it to the burner. It will be seen that the object of the conical groove on plug C is so constructed that the escape of gas through the cock shall be according to the pressure of the gas in the cylinder, the higher the pressure the less must be the aperture and when the plug shall have turned once around the aperture of the groove is large enough for the needed quantity of gas to escape with no other pressure than its own weight. So that by this arrangement the escape of gas is always the same while the pressure of gas in the cylinder is always varying.

The fly wheel M, on shaft I is intended to regulate the speed of the machinery. The machine can be stopped when the gas is not being consumed by any well known device applied to the fly wheel and the flow of gas from cylinder C is cut off by turning cock $a$.

Having thus fully described the construction and operation of our invention what we claim as new and desire to secure by Letters Patent, is,

The cock F, with conical plug B, on which is cone shaped groove $f$, extending entirely around the same in combination with the mechanical devices arranged and operating as described and for the purpose of a portable gas apparatus for vessels cars &c.

O. L. LAWSON.
A. A. STARR.

In presence of—
 WM. DIXEY,
 A. S. PALMER.